US008982406B2

(12) United States Patent
Mizutani

(10) Patent No.: US 8,982,406 B2
(45) Date of Patent: Mar. 17, 2015

(54) FILE-GENERATING DEVICE

(75) Inventor: Norio Mizutani, Mie-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 232 days.

(21) Appl. No.: 13/051,989

(22) Filed: Mar. 18, 2011

(65) Prior Publication Data

US 2011/0310402 A1 Dec. 22, 2011

(30) Foreign Application Priority Data

Jun. 16, 2010 (JP) .................................. 2010-137774

(51) Int. Cl.
*G06F 3/12* (2006.01)
*H04N 1/60* (2006.01)
*H04N 1/21* (2006.01)
*H04N 1/40* (2006.01)
*B41J 29/393* (2006.01)
*G06K 9/00* (2006.01)
*H04N 1/387* (2006.01)

(52) U.S. Cl.
CPC ............ *G06F 3/1206* (2013.01); *G06F 3/1208* (2013.01); *G06F 3/1232* (2013.01); *G06F 3/1254* (2013.01); *G06F 3/128* (2013.01); *H04N 1/3873* (2013.01)
USPC ............ 358/1.2; 358/1.15; 358/1.9; 358/296; 358/448; 347/19; 382/162

(58) Field of Classification Search
USPC ........ 358/1.2, 1.9, 448, 296; 347/19; 382/162
See application file for complete search history.

(56) References Cited

U.S. PATENT DOCUMENTS

| 2001/0006560 | A1* | 7/2001 | Gilman et al. ................. 382/162 |
| 2001/0043359 | A1 | 11/2001 | Mori et al. |
| 2005/0088694 | A1* | 4/2005 | Ogiwara ....................... 358/1.18 |
| 2006/0215217 | A1* | 9/2006 | Ujigawa ....................... 358/1.15 |
| 2006/0290993 | A1 | 12/2006 | Suzuki et al. |
| 2007/0035782 | A1* | 2/2007 | Mitani .......................... 358/448 |

(Continued)

FOREIGN PATENT DOCUMENTS

| JP | H11-099724 A | 4/1999 |
| JP | 2001-344232 A | 12/2001 |

(Continued)

OTHER PUBLICATIONS

Japan Patent Office, Office Action for Japanese Patent Application No. 2010-137774 (counterpart to above-captioned patent application), mailed May 21, 2013.

*Primary Examiner* — Miya J Cato
*Assistant Examiner* — Temitayo Folayan
(74) *Attorney, Agent, or Firm* — Merchant & Gould PC

(57) ABSTRACT

In a file-generating device, the image acquiring unit is configured to acquire image data indicating an original image. The generating unit is configured to generate a document file having no data to specify a page, by using the image data. The printer data acquiring unit is configured to acquire a prescribed size of a sheet that is used by a target printer and a first margin corresponding to the prescribed size of the sheet. The target printer is to print the original image on a recording sheet based on the document file. The printable region determining unit is configured to determine a printable region within which the target printer is configured to print an image on the sheet, based on the prescribed size of the sheet and the first margin. The generating unit generates the document file such that the original image is positioned within the printable region.

9 Claims, 7 Drawing Sheets

(56) References Cited

U.S. PATENT DOCUMENTS

2008/0186516 A1* 8/2008 Tayama .................... 358/1.2
2008/0291492 A1* 11/2008 Miyagi et al. ............ 358/1.15
2009/0141067 A1* 6/2009 Kato ........................ 347/19

FOREIGN PATENT DOCUMENTS

| JP | 2004-326817 A | 11/2004 |
| JP | 2007-006120 A | 1/2007 |
| JP | 2008-262439 A | 10/2008 |

* cited by examiner

FILE-GENERATING DEVICE

CROSS REFERENCE TO RELATED APPLICATION

This application claims priority from Japanese Patent Application No. 2010-137774 filed Jun. 16, 2010. The entire content of the priority application is incorporated herein by reference.

TECHNICAL FIELD

The invention relates to a file-generating device and a file-generating program for generating a document file based on a file format having no page concept.

BACKGROUND

There exists a technology known in the art for generating a PDF file from image data acquired by scanning an original document. In this technology, a PDF file for one page is generated for each page of the original document using the corresponding scanned image data. When a print command is issued for a PDF file, the single-page PDF file is printed so as to fit within the specified paper size.

SUMMARY

However, a problem occurs when printing a document file generated from an image file based on a file format having no page concept. Namely, the document file may end up being printed on a plurality of pages since an image file corresponding to one sheet of an original document does not necessarily fit within one page.

Since the document file in this case uses a file format with no page concept, the document file is divided into pages when a print command is issued, but the size of the pages is set without consideration for the image file corresponding to the single-page of the original document.

Therefore, it is an object of the invention to provide a file-generating device and a file-generating program capable of generating a document file from an image file based on a file format with no page concept so as to prevent the image file from being spread over a plurality of pages when the document file is printed.

In order to attain the above and other objects, the invention provides a file-generating device. The file-generating device includes an image acquiring unit, a generating unit, a printer data acquiring unit, and a printable region determining unit. The image acquiring unit is configured to acquire image data indicating an original image. The generating unit is configured to generate a document file having no data to specify a page, by using the image data. The printer data acquiring unit is configured to acquire a prescribed size of a sheet that is used by a target printer and a first margin corresponding to the prescribed size of the sheet. The target printer is to print the original image on a recording sheet based on the document file. The printable region determining unit is configured to determine a printable region within which the target printer is configured to print an image on the sheet, based on the prescribed size of the sheet and the first margin. The generating unit generates the document file such that the original image is positioned within the printable region.

According to another aspect, the invention provides a non-transitory computer readable storage medium storing a set of program instructions installed on and executed by a computer for controlling a file-generating device. The program instructions includes: acquiring image data indicating an original image, the image data being to be used to generate a document file; acquiring a prescribed size of a sheet that is used by a target printer and a first margin corresponding to the prescribed size of the sheet, where the target printer is to print the original image on a recording sheet based on the document file; and determining a printable region within which the target printer is configured to print an image on the sheet, based on the prescribed size of the sheet and the first margin; and generating a document file having no data to specify a page by using the image data such that the original image is positioned within the printable region.

BRIEF DESCRIPTION OF THE DRAWINGS

The particular features and advantages of the invention as well as other objects will become apparent from the following description taken in connection with the accompanying drawings, in which:

FIG. 5(*b*) is an explanatory diagram illustrating an example in which the borders of the cell region are adjusted;

FIG. 5(*c*) is an explanatory diagram illustrating an example in which the borders of the cell region are adjusted;

DETAILED DESCRIPTION

In the following description, a document file generated based on a file format having no page concept will simply be referred to as a document file. That is, the document file in the embodiment has no data specifying the page. Examples of document files are an Excel (registered trademark) file and a HyperText Markup Language (HTML) file.

Document File Generating System

Figure 1:
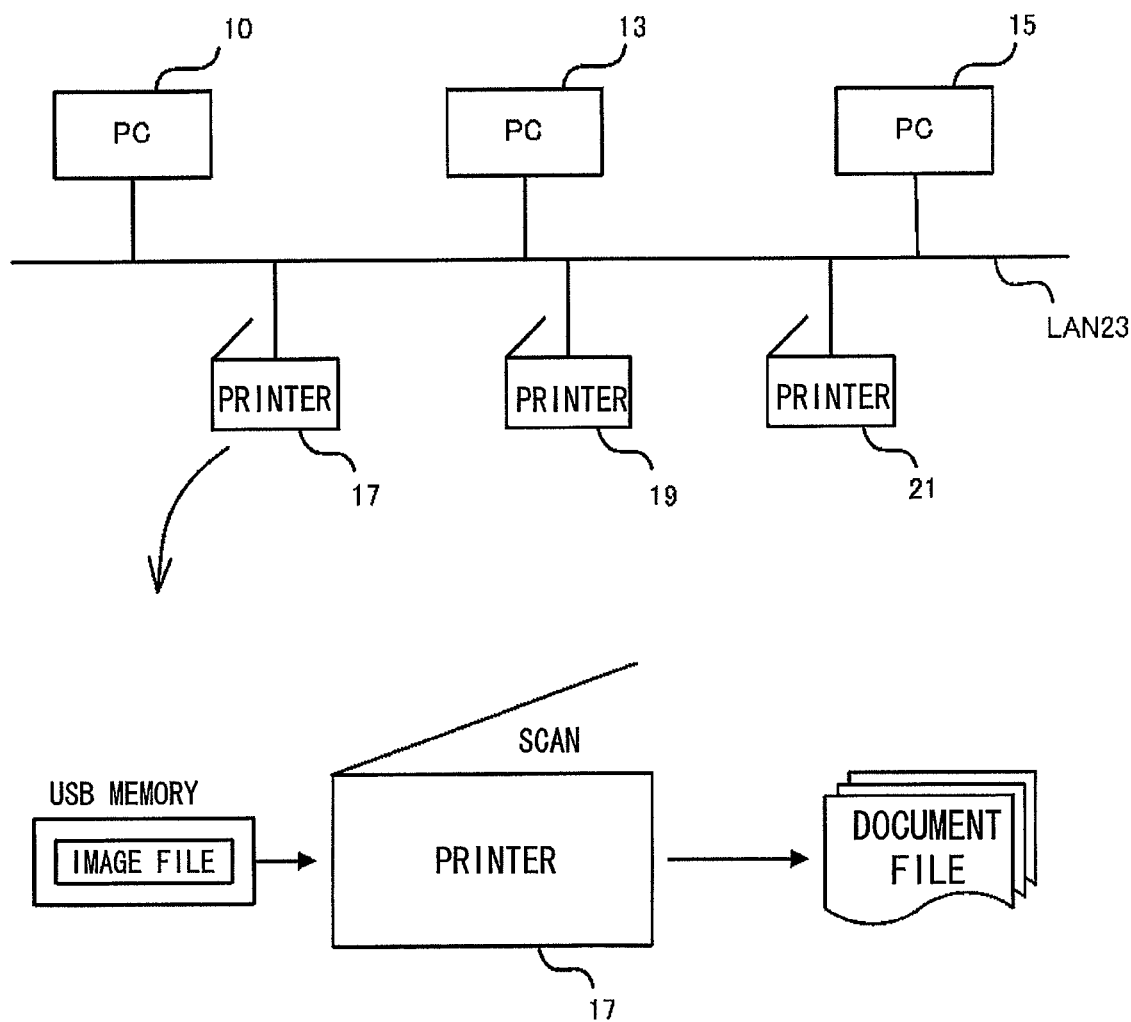
FIG. 1 is a block diagram illustrating components of a document file generating system according to an embodiment.

First, a document file generating system 1 according to the embodiment will be described with reference to FIG. 1. FIG. 1 is a block diagram showing the components of the document file generating system 1 according to the embodiment.

As shown in FIG. 1, in the document file generating system, a personal computer (PC) 10, a PC 13, a PC 15, a printer 17, a printer 19, and a printer 21 are all connected to a local area network (LAN) 23.

The PCs 10, 13, and 15 share the printers 17, 19, and 21 over the LAN 23. Each of the PCs 10, 13, and 15 has a setting indicating which of the printers will execute a print job when a print command is issued (hereinafter referred to as the "default printer").

The printer 17 stores a document file generating program for generating a document file from an acquired image file. An image file is acquired from a reading unit 37 (see FIG. 2) provided in the printer 17 when the reading unit 37 reads an original document. An image file may also be acquired from a USB memory device storing the image file when the USB memory device is connected to the printer 17 through a USB interface.

A document file is stored on the printer 17 when the user specifies the printer 17 as the destination for storing the file. However, if the user specifies one of the PCs on the LAN 23 as the destination, the printer 17 transfers the document file to the specified PC, and the document file is stored on that PC.

Structure of the Printer 17

Figure 2:
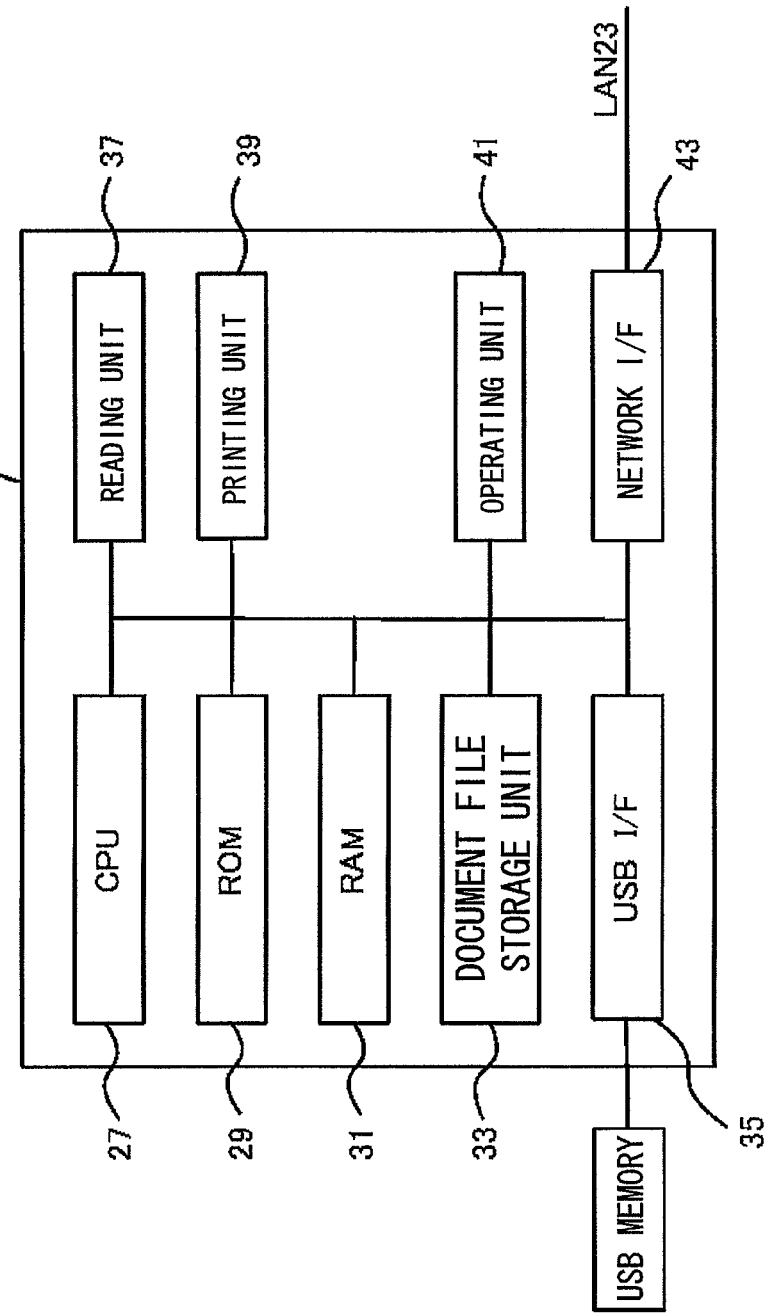
FIG. 2 is a block diagram illustrating a structure of a printer.

Next, the structure of the printer 17 will be described with reference to FIG. 2. FIG. 2 is a block diagram showing the structure of the printer 17.

The printer 17 includes a CPU 27, a ROM 29, a RAM 31, a document file storage unit 33, a USB interface 35, the reading unit 37, a printing unit 39, an operating unit 41, and a network interface 43. The CPU 27 performs overall control of all components in the printer 17.

The ROM 29 stores the document file generating program. The CPU 27 performs a document file generation process described later by executing the document file generating program.

The RAM 31 is used as a storage area for storing data that is created when the CPU 27 executes various processes and as a storage area temporarily used by the CPU 27 when the CPU 27 performs various processes.

When the user specifies the printer 17 as the destination for storing a document file, the document file is stored in the document file storage unit 33 of the printer 17.

The USB interface 35 is an interface for connecting to a USB memory device. The reading unit 37 scans an original document placed thereon to read an image from the original document and acquire an image file. The printing unit 39 executes a printing process based on print commands.

The operating unit 41 includes operating keys. By operating the operating unit 41, the user can input various settings such as the size of the original document being scanned, the storage destination for the document file, and a margin in a printable region (described later). The user can also input an instruction on the operating unit 41 to scan an original document set on the reading unit 37.

The network interface 43 has an interface that functions to connect the printer 17 to the LAN 23 or another network.

Document File Generation Process

Figure 3:
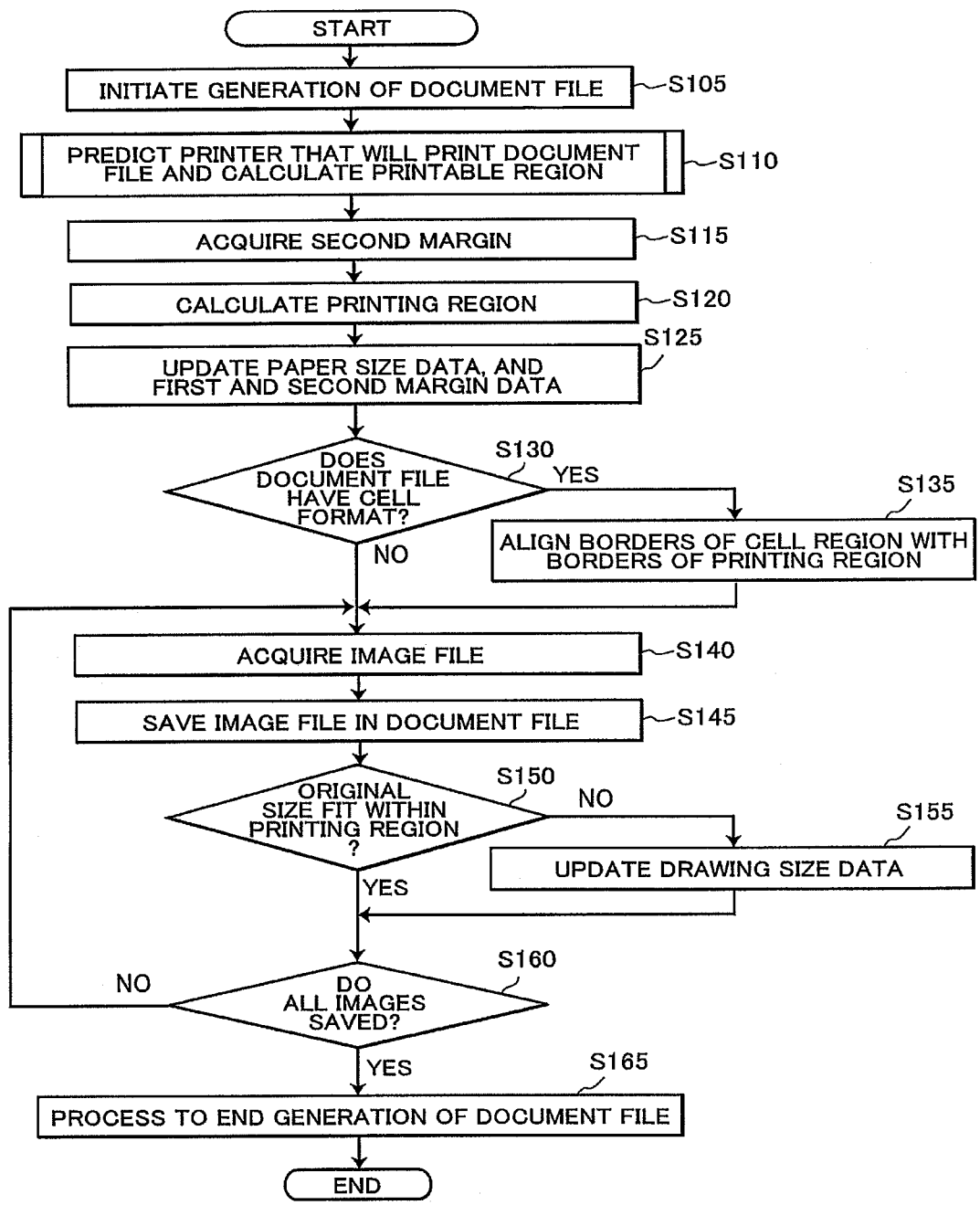
FIG. 3 is a flowchart illustrating steps in a document file generation process.

Next, a document file generation process will be described with reference to FIG. 3. FIG. 3 is a flowchart illustrating steps in the document file generation process.

The CPU 27 of the printer 17 begins the document file generation process when the user places an original document on the reading unit 37; sets the format for the document file to be created (Excel (registered trademark) or HTML, for example), the size of the original document, the destination for saving the document file, and the margin provided in the printable region (described later); and inputs a command to scan the original document. The RAM 31 stores the above settings that the user sets.

The reading unit 37 executes a scanning process to scan the original document as a parallel process to the document file generation process described below. The image file obtained when the reading unit 37 scans the original document is stored in the RAM 31.

In S105 at the beginning of the document file generation process, the CPU 27 executes a process to initiate generation of a document file. The process to initiate generation of a document file is a preparatory process for creating a new document file, and specifically is a process for generating an empty document file. The process for initiating generation of a document file is well known in the art and will not be described herein.

In S110 the CPU 27 predicts the printer that will print the document file generated in the document file generation process and the printing conditions that will be used when printing the document file, and calculates the printable region. The method of predicting the printer that will print the document file and the printing conditions that will be used for printing the document file will be described later with reference to FIG. 6.

Figure 4:
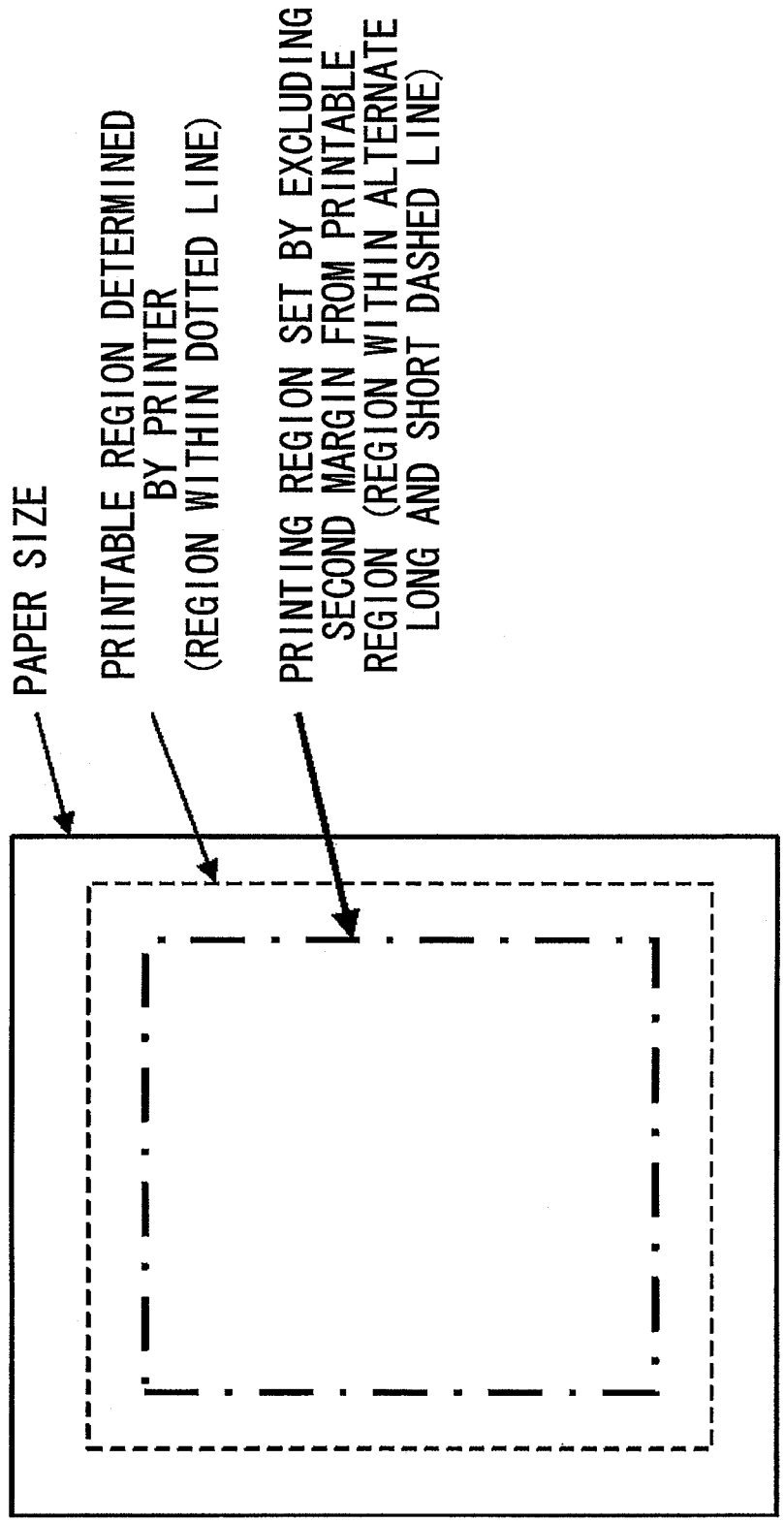
FIG. 4 is an explanatory diagram illustrating a document size, a printable region, and a printing region.

The printing conditions predicted by the CPU 27 are conditions to be used for printing the document file by the printer expected to be the printer printing the document file (hereinafter referred to as the "predicted printer"), and includes such conditions as the paper size, whether or not to provide margins, and the size of the margins when margins are provided. The printable region is a region indicated by the dotted line in FIG. 4, for example, and is equivalent to the paper size that the predicted printer will use when printing the document file, excluding the margin portion that the predicted printer provides on that paper size. Hence, the printable region is equivalent to the paper size when the printing conditions indicate that the predicted printer has set this margin to "0" (i.e., the printer will not provide a margin when printing the document file). Hereinafter, the margin that the predicted printer provides for the paper size when printing the document file will be called the "first margin."

In S115 the CPU 27 acquires a margin provided within the printable region from the RAM 31. This is a margin that the user sets on the operating unit 41 when inputting a scanning command to initiate scanning of the original document. Here, the user can set a suitable margin when wishing to add a title or page number to the document file. The size of this user-specified margin is stored in the RAM 31. The margin may also be preset in the printer 17. Hereinafter, the margin provided within the printable region will be called the "second margin."

In S120 the CPU 27 calculates a printing region based on the printable region and the second margin acquired in S115. In the example shown in FIG. 4, the printing region is the region defined by the chain line and is equivalent to the printable region, excluding the second margin set by the user. The printing region is equivalent to the printable region when the user has set the second margin to "0".

In S125 the CPU 27 updates the paper size data, the first margin data, and the second margin data to be used for printing the empty document file. The paper size data and the first and second margin data for the empty document file are set to default values during the process to initiate generation of a document file of S105. Specifically, in S125 the CPU 27 updates the default paper size data to data indicating the paper size included in the printing conditions predicted in S110, updates the default first margin data to data indicating the first margin included in the printing conditions predicted in S110, and updates the default second margin data to data indicating the second margin acquired in S115.

In S130 the CPU 27 determines whether the document file has a cell format. Here, a cell format is format for arranging data in a plurality of cells arranged in a grid having rows and columns. In S130 the CPU 27 determines whether the format of the document file set by the user and stored in the RAM 31 is the cell format.

Figure 5A:
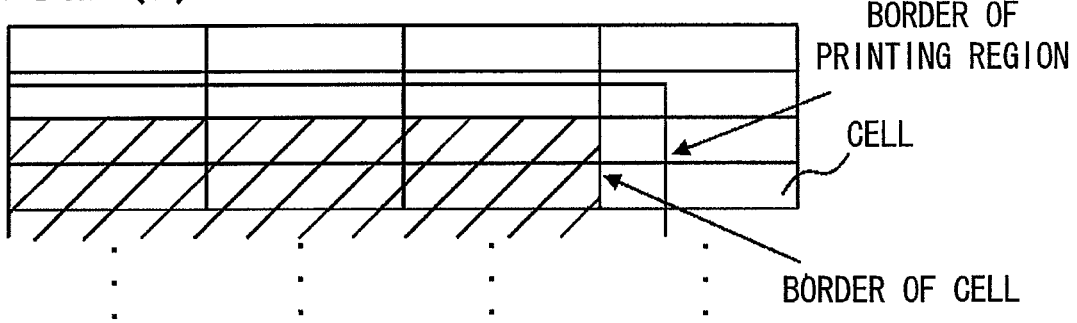
FIG. 5(*a*) is an explanatory diagram illustrating an adjustment of borders of a cell region.
Figure 5B:
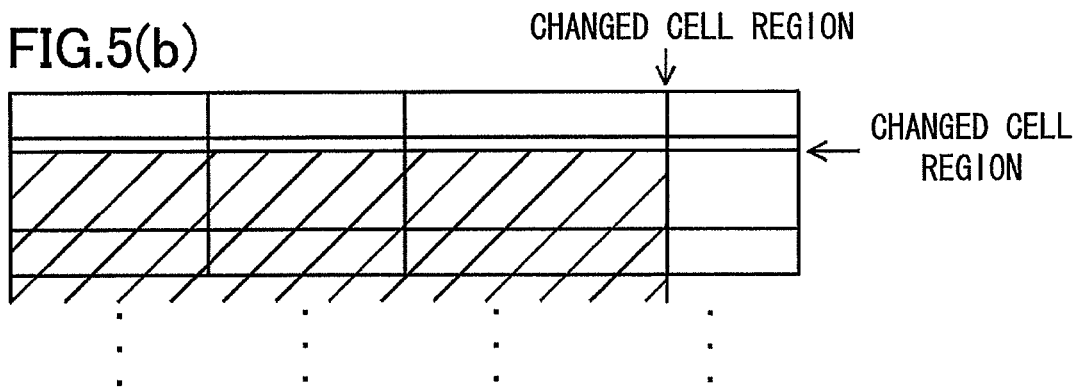
Figure 5C:
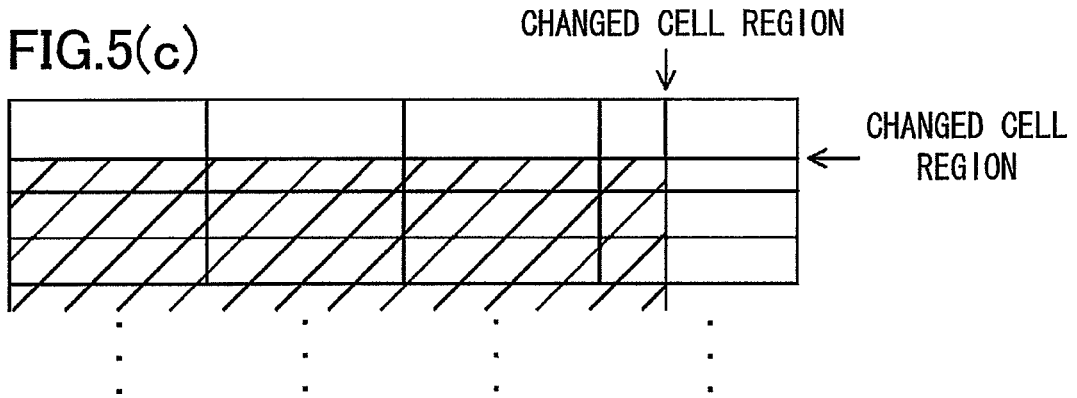

If the CPU 27 determines that the document file has a cell format (S130: YES), in S135 the CPU 27 aligns the outer borders of the cell region with the borders of the printing region. That is, when the borders of the printing region do not match the borders of the cell region, as illustrated in FIG. 5(a), the CPU 27 changes the cell region so that the borders of the cells are aligned with the borders of the printing region, as illustrated in FIGS. 5(b) and 5(c). In the example shown in FIG. 5(a), only the region enclosed in the cell borders (the shaded region in FIG. 5(a)) will be printed. Although this region falls within the printing region, the cells can be printed so as to fill the printing region by aligning the outer borders of the cell region with the borders of the printing region. Further, the borders of the printing region are more readily discernible when the borders of the cell region are aligned with the borders of the printing region, improving the overall appearance.

The CPU 27 advances to S140 after completing the process in S135 or when determining in S130 that the document file does not have a cell format (S130: NO). In S140 the CPU 27 acquires one image file stored in the RAM 31.

In S145 the CPU 27 saves the image file acquired in S140 in the document file generated in S105. More specifically, one image file acquired in S140 is saved in the document file along with drawing position data indicating the position for drawing the image file, and drawing size data specifying the size at which the image file should be drawn. Here, the drawing position data saved in S145 indicates a printing region in which the image file is not yet positioned. Further, the drawing size data saved in S145 indicates the original size of the image file.

In S150 the CPU 27 determines whether the original size of the image file acquired in S140 fits within the printing region. More specifically, the CPU 27 determines whether the drawing size data indicating the original size of the image file saved in S145 specifies a size that fits within the printing region.

If the CPU 27 determines that the image file acquired in S140 does not fit within the printing region (S150: NO), in S155 the CPU 27 updates the drawing size data for the image file to data specifying the maximum size of an image that can fit within the printing region. Subsequently, the CPU 27 advances to S160.

However, if the CPU 27 determines in S150 that the acquired image file fits within the printing region (S150: YES), the CPU 27 advances to S160.

In S160 the CPU 27 determines whether all image files stored in the RAM 31 have been saved in the document file.

If the CPU 27 determines that not all image files have been saved in the document file (S160: NO), the CPU 27 returns to S140 and repeats the process in S140-S155 until the process has been completed for all image files.

When the CPU 27 determines that all image files have been saved (S160: YES), in S165 the CPU 27 initiates a process to end generation of the document file. The process to end generation of the document file is the last process commonly performed when creating a new file and is equivalent to a file closing operation. The process for ending generation of a document file is well known in the art and will not be described herein.

The current document file generation process ends after completing the process to end generation of the document file.

Printable Region Calculation Process

Figure 6:
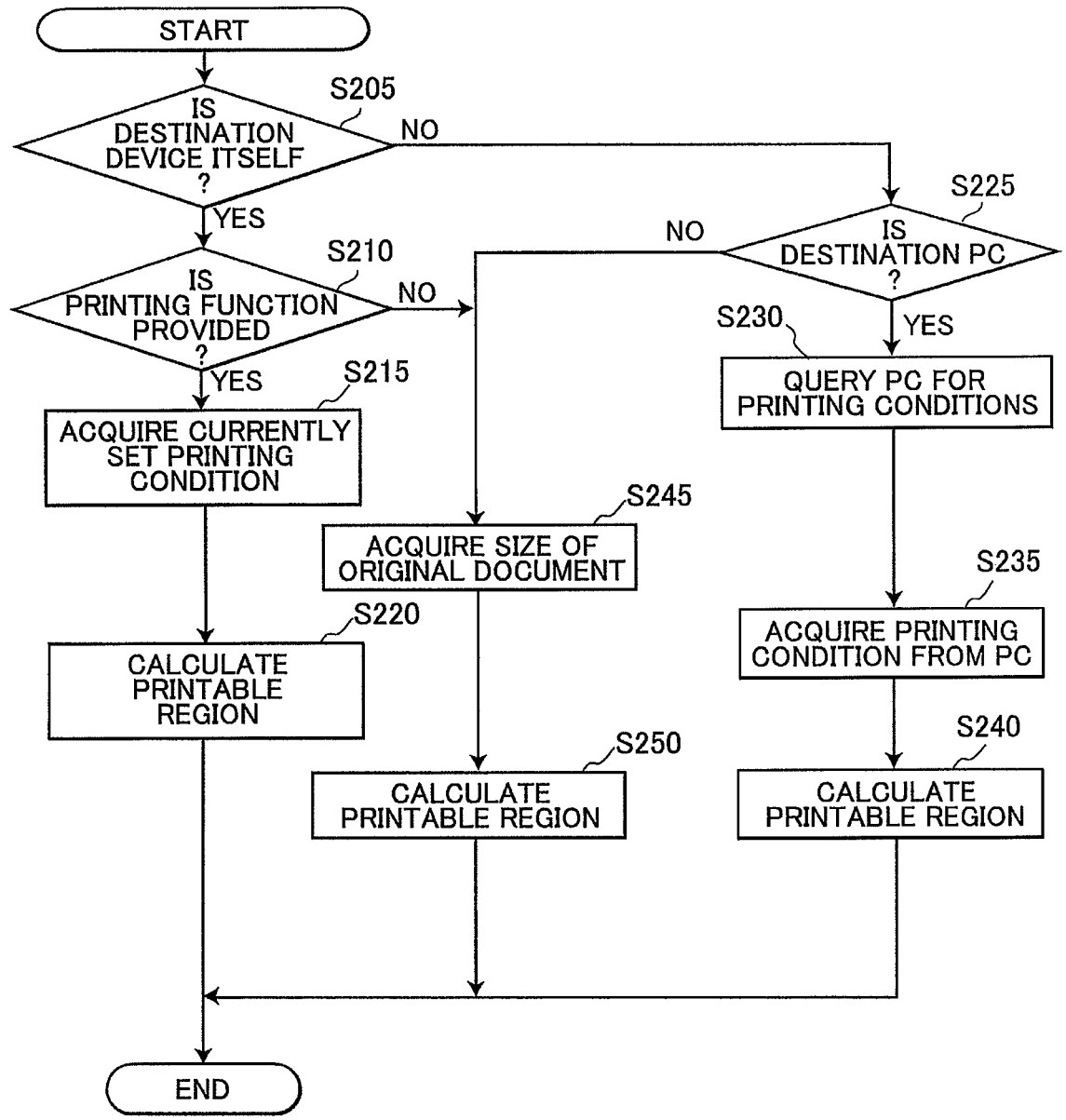
FIG. 6 is a flowchart illustrating steps in a printable region calculation process.

Next, the process for calculating the printable region in S110 will be described with reference to FIG. 6. FIG. 6 is a flowchart illustrating steps in the printable region calculation process.

In S205 at the beginning of the printable region calculation process, the CPU 27 acquires from the RAM 31 the destination specified by the user for saving the document file and determines whether the destination is the printer 17 itself.

If the CPU 27 determines that the destination for the document file is the printer 17 itself (S205: YES), in S210 the CPU 27 determines whether a printing function is provided in the printer 17. Since a printing function is always provided in a printer when the document file generating program in the embodiment is applied only to printers, the process in S210 may be omitted. However, the process in S210 is essential when the document file generating program is applied to devices without a printing function, such as a scanning device that possesses a reading function but not a printing function or an image-processing device that possesses a USB interface but not a printing function. In such cases, the CPU 27 determines in S205 whether the destination of the file is its own device.

If the CPU 27 determines in S210 that the printer 17 possesses a printing function (S210: YES), in S215 the CPU 27 acquires the printing conditions currently set in the printer 17. The printer 17 stores currently set printing conditions in the ROM 29.

In S220 the CPU 27 calculates the printable region from the printing conditions acquired in S215. That is, the CPU 27 calculates the printable region based on the paper size data and the first margin data included in the printing conditions. The current printable region calculation process ends after completing the process in S220.

Hence, when the destination for the document file is the printer 17 itself, the CPU 27 predicts that the document file is to be printed by the printer 17 and predicts that the printing conditions for the document file are the conditions currently set on the printer 17.

However, if the CPU 27 determines in S205 that the destination for the document file is not the printer 17 (S205: NO), in S225 the CPU 27 determines whether the destination for the document file is a PC (10, 13, or 15) on the LAN 23.

When the CPU 27 determines that the destination for the document file is a PC on the LAN 23 (S225: YES), in S230 the CPU 27 queries the destination PC for printing conditions used by its default printer. Each PC on the LAN 23 has settings for its default printer and the printing conditions used by the default printer. In S235 the CPU 27 acquires the printing conditions used by the default printer from the destination PC.

In S240 the CPU 27 calculates the printable region from the printing conditions acquired in S235 and subsequently ends the current printable region calculation process. The process in S240 is identical to that in S220.

Hence, when the destination for saving a document file is a PC on the LAN 23, the CPU 27 predicts that the document file will be printed by the default printer set on the destination PC and predicts that the printing conditions for the document file will be the printing conditions set on the destination PC as conditions used by the default printer. Accordingly, the printable region is calculated by the printing conditions in the default printer that is predicted to have a highest possibility to print the image based on the document file.

However, if the CPU 27 determines in S225 that the destination for the document file is not a PC on the LAN 23 (S225: NO), in S245 the CPU 27 acquires the size of the original document specified by the user when the original document was scanned. The size of the original document is stored in the RAM 31.

In S250 the CPU 27 calculates the printable region based on the original size acquired in S245. Here, since the CPU 27 cannot predict the printer that will print the document file, in S250 the CPU 27 sets the paper size to the size of the scanned original document and calculates the printable region using a suitable value as the first margin (5 mm, for example). The suitable values corresponding to the document sizes are stored in the ROM 29, for example. Subsequently, the current printable region calculation process ends.

Hence, when the destination of the document file is neither the printer 17 nor a PC on the LAN 23, the CPU 27 predicts that the document file will be printed at the original size. When using an image file saved on a USB storage device, the CPU 27 acquires the size of the image file as the original size in S245.

Also, if the CPU 27 determines in S210 that a printing function is not provided (S210: NO), the CPU 27 predicts that the document file will be printed at the original size (S245 and S250).

According to the embodiment, the document file is generated so as to prevent one image specified by one image file from being spread over a plurality of sheets when the printing operation is performed based on the document file.

Variation of the Embodiment

Figure 7:
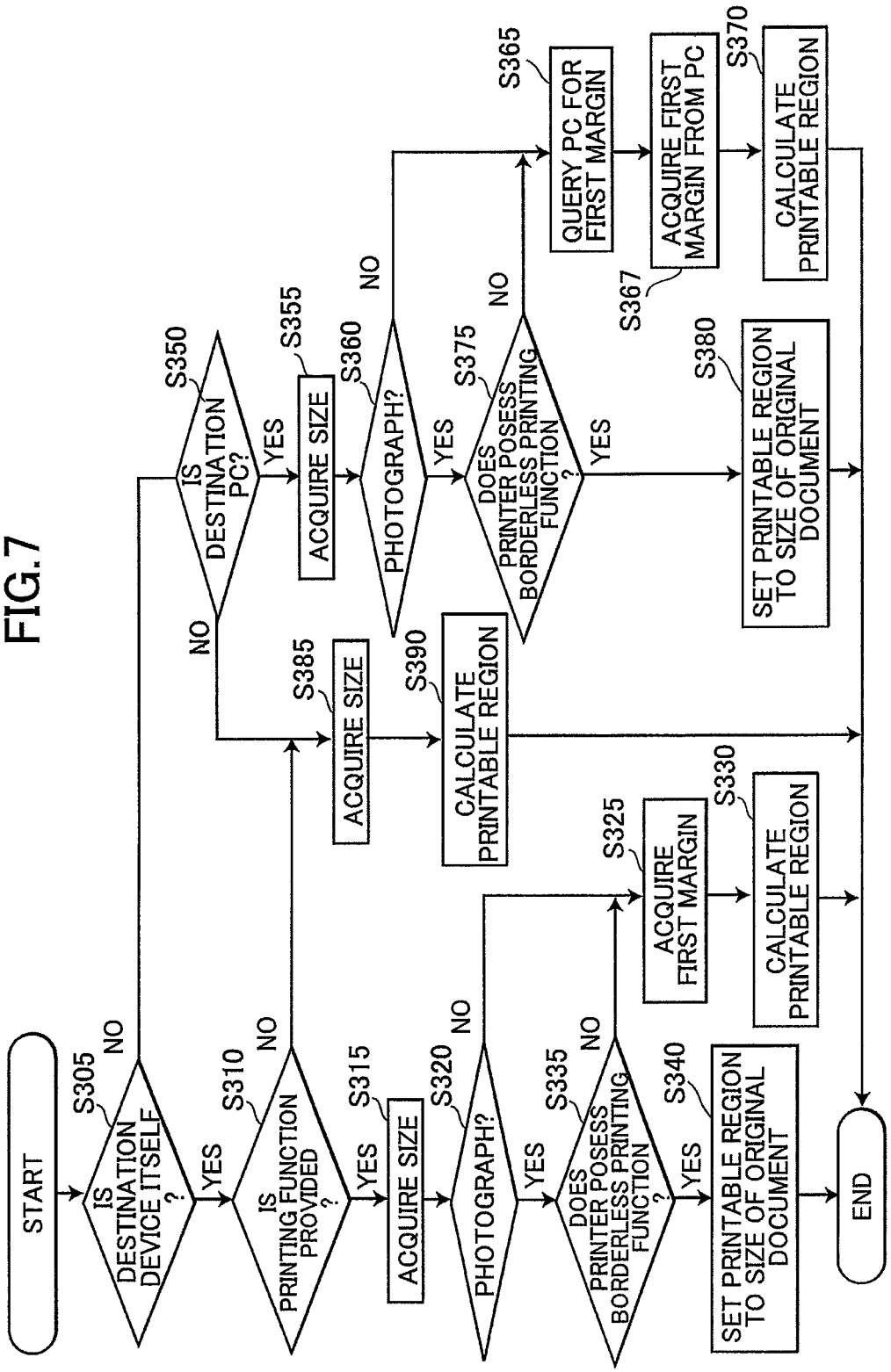
FIG. 7 is a flowchart illustrating steps in a printable region calculation process according to a variation of the embodiment.

Next, a variation of the printable region calculation process in the embodiment will be described with reference to FIG. 7. FIG. 7 is a flowchart illustrating steps in the variation of this process.

In S305 at the beginning of the process, the CPU 27 acquires the destination for the document file specified by the user from the RAM 31 and determines whether the destination is the printer 17 itself.

If the CPU 27 determines that the destination for the document file is the printer 17 itself (S305: YES), in S310 the CPU 27 determines whether the printer 17 has a printing function. The processes in S305 and S310 are identical to those in S205 and S210 described in the embodiment.

If the CPU 27 determines that the printer 17 has a printing function (S310: YES), in S315 the CPU 27 acquires the size of the original document specified by the user for scanning the original document. The size of the original document is stored in the RAM 31.

Hence, when the destination for the document file is the printer 17 itself, the CPU 27 predicts that the document file will be printed on the printer 17 and predicts that the file will be printed at the original size.

In S320 the CPU 27 determines whether the original document is a photograph based on the image data for the original document scanned by the reading unit 37. The image data includes color data (hue), lightness, chroma, or the like for each pixel of the image that the reading unit 37 acquires when scanning and reading an original document. In S320 the CPU 27 determines that the original document is a photograph when the acquired image is rectangular with non-uniform color data.

If the CPU 27 determines that the original document is not a photograph (S320: NO), in S325 the CPU 27 acquires the first margin that the printer 17 has set for the size of the original document acquired in S315. The printer 17 stores the first margin set for the original size in the ROM 29.

In S330 the CPU 27 calculates the printable region from the original size and the first margin acquired in S325. Specifically, the CPU 27 calculates the printable region to be the original size minus the first margin acquired in S325.

Thus, when the original document is not a photograph, the CPU 27 determines that there is low probability that the image will be printed according to borderless printing described later, and calculates the printable region based on the first margin.

However, if the CPU 27 determines in S320 that the original document is a photograph (S320: YES), in S335 the CPU 27 determines whether the printer 17 possesses a borderless printing function. The borderless printing function is a function that enables the printer to print an image on paper without margins on the top, bottom, left, and right edges. A flag for checking whether the printer 17 possesses the borderless printing function is stored in the ROM 29. If the flag is ON, the CPU 27 determines that the printer 17 possesses the borderless printing function. If the flag is OFF, the CPU 27 determines that the printer 17 does not possess the borderless printing function.

If the CPU 27 determines in S335 that the printer 17 does not possess a borderless printing function (S335: NO), the CPU 27 executes the processes in S325 and S330 described above.

Hence, if the printer 17 does not have a borderless printing function, the CPU 27 calculates the printable region using the first margin, even when the original document is a photograph.

However, if the CPU 27 determines in S335 that the printer 17 possesses a borderless printing function (S335: YES), in S340 the CPU 27 sets the printable region to the size of the original document.

Hence, when the original document is a photograph and the printer 17 possesses a borderless printing function, the CPU 27 predicts that there is a strong possibility a borderless print will be performed and sets the printable region to the size of the original document.

On the other hand, if the CPU 27 determines in S305 that the destination for the document file is not the printer 17 itself (S305: NO), then in S350 the CPU 27 determines whether the destination for the document file is a PC on the LAN 23.

If the CPU 27 determines that the destination for the document file is a PC on the LAN 23 (S350: YES), then the CPU 27 advances to S355.

Next, the process in S355-S380 will be described. Of these steps, S355 is identical to S315 of the embodiment, S360 to S320, S370 to S330, and S380 to S340. Further, similarly to S335, in S375 the CPU 27 determines whether the default printer set in the PC possesses the borderless printing function. In S365 the CPU 27 queries the destination PC for the first margin set by the default printer for the size of the original document acquired in S355. The PC on the LAN 23 stores the first margin set by the default printer for each paper size. In S367 the CPU 27 acquires from the destination PC the first margin set by the default printer for the original size acquired in S355.

However, when the CPU 27 determines in S350 that the destination for the document file is not a PC on the LAN 23 (S350: NO) or when the CPU 27 determines in S310 that the printer 17 does not possess a printing function (S310: NO), then the CPU 27 executes the processes in S385 and S390. The processes in S385 and S390 are identical to the processes in S245 and S259 described in the embodiment.

While the invention has been described in detail with reference to the embodiment thereof, it would be apparent to those skilled in the art that various changes and modifications may be made therein without departing from the spirit of the invention.

For example, the document file generating program of the invention is executed on the printer 17 in the embodiment, but the program may be installed and executed on a PC.

Further, the document file generation process in the embodiment predicts the printer that will print the document file and the printing conditions that will be used by the printer when printing the document file. However, the process for predicting the printer that will print the document file (S305, S310, and S350) may be omitted when only one printer is available on the LAN. In this case, the printable region can be calculated by acquiring the printing conditions currently set on this printer. Moreover, the process for predicting the printing conditions described in the embodiment (S215 and S235) may also be omitted when only one printer is available on the LAN and when this printer only uses A4-size sheets when printing, for example. In this case, the printable region is calculated by acquiring the first margin that has been set by the lone printer available on the LAN for A4-size sheets.

In the embodiment, when a PC on the LAN 23 is the destination for the document file, the CPU 27 acquires the printing conditions used by the default printer for the PC by querying the PC. However, the printer 17 may be configured to manage default printers and their printing conditions stored on PCs connected to the LAN 23, for example.

What is claimed is:

1. A file-generating device provided in a network comprising:
   a network interface; and
   a processor configured to:
      acquire image data indicating an original image;
      acquire destination data including a destination where a document file, which is to be generated based on the image data, is to be stored;
      acquire, via the network interface, a prescribed size of a sheet to be used by a target printer, which is a default printer set in a terminal device, and a first margin, which corresponds to the prescribed size of the sheet, from the terminal device, which is different from a printer, when the acquired destination data indicates the terminal device;
      determine, based on the prescribed size of the sheet and the first margin, a printable region within which the target printer is configured to print an image on the sheet; and
      generate the document file having a plurality of cells arranging in one or more columns and one or more rows;
      determine a printing region that is within the printable region, the printing region having at least two cells from among the plurality of cells;
      align a border of a cell to a border of the printing region;
      save the image data, drawing size data, and drawing position data in the document file after the processor aligns the border of cell to the border of the printing region, the drawing size data specifying a size of an image to be drawn based on the image data, the drawing position data indicating the at least two cells included in the printing region; and
      store the document file in the terminal device indicated by the destination data,
   wherein the size of the image is determined such that the size of the image is equal to or smaller than a size of the printing region,
   wherein the image is to be drawn based on the image data, drawing size data, and the position data such that the image based on the image data is drawn on the at least two cells.

2. The file-generating device according to claim 1, wherein the image data includes size data specifying a size of the original image,
   wherein, when and the size specified by the image data is larger than a size of the printing region, the processor sets the drawing size data specifying a maximum size that fits to the printing region.

3. The file-generating device according to claim 1, further comprising a scanner configured to scan an original document and generate the image data that is acquired by the processor,
   wherein the processor is further configured to:
      specify a size of the sheet when the destination data indicates the file-generating device and the scanner scans the original document;
      set the prescribed size of the sheet to the size of the sheet specified by the scanner when the destination data indicates the file-generating device; and
      set the first margin based on the size of the sheet specified by the scanner when the destination data indicates the file-generating device.

4. The file-generating device according to claim 1,
   wherein the processor is further configured to acquire the prescribed size of a sheet and the first margin, each of which is set in the file-generating device, when the destination data indicates the file-generating device.

5. The file-generating device according to claim 4, wherein the processor is further configured to:
   determine whether the original document is a photograph based on the image data generated by the scanner; and
   determine whether the target printer is configured to execute a borderless printing operation, in which an image is printed without a margin, when the processor determines that the original document is the photograph; and
   set the first margin zero when the processor determines that the target printer is configured to execute the borderless printing operation.

6. The file-generating device according to claim 1, wherein the processor is further configured to:
   acquire a second margin that is set inside the printable region;
   calculate the printing region by excluding the second margin from the printable region.

7. The file-generating device according to claim 1, wherein the document file is one of an Excel® file and a HyperText Markup Language file.

8. The file-generating device according to claim 1, wherein the document file is one of an Excel® file and a HyperText Markup Language file.

9. A non-transitory computer readable storage medium storing computer-readable instructions that, when executed by a computer configured to control a file-generating device, instruct the computer to perform processes comprising:
   acquiring image data indicating an original image;
   acquiring destination data indicating a destination where a document file, which is to be generated based on the image data, is to be stored;
   acquiring, via network interface of the file-generating device, a prescribed size of a sheet to be used by a target printer, which is a default printer set in a terminal device, and a first margin, which corresponds to the prescribed size of the sheet, from the terminal device, which is different from a printer, when the acquired destination data indicates the terminal device;
   determining, based on the prescribed size of the sheet and the first margin, a printable region within which the target printer is configured to print an image on the sheet;
   generating the document file having a plurality of cells arranged in one or more columns and one or more rows;
   determining a printing region that is within the printable region, the printing region having at least two cells from among the plurality of cells;
   aligning a border of a cell to a border of the printing region;

saving the image data, drawing size data, and drawing position data in the document file after the processor aligns the border of cell to the border of the printing region, the drawing size data specifying a size of an image to be drawn based on the image data, the drawing position data indicating the at least two cells included in the printing region; and storing the document file in the terminal device indicated by the destination data, wherein the size of the image is determined such that the size of the image is equal to or smaller than a size of the printing region, wherein the image is to be drawn based on the image data, the drawing size data, and the position data such that the image based on the image data is drawn on the at least two cells.

\* \* \* \* \*